United States Patent
Chikyu (10) Patent No.: US 8,199,169 B2
(45) Date of Patent: Jun. 12, 2012

(54) DOCUMENT INFORMATION MANAGING APPARATUS AND COMPUTER READABLE MEDIUM

(75) Inventor: Masafumi Chikyu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 962 days.

(21) Appl. No.: 12/129,275

(22) Filed: May 29, 2008

(65) Prior Publication Data

US 2009/0160875 A1    Jun. 25, 2009

(30) Foreign Application Priority Data

Dec. 19, 2007 (JP) ................................ 2007-327079

(51) Int. Cl.
*G09G 5/00* (2006.01)
(52) U.S. Cl. ........................................ 345/660; 345/629
(58) Field of Classification Search .................... None
See application file for complete search history.

(56) References Cited

U.S. PATENT DOCUMENTS

| | | | | |
|---|---|---|---|---|
| 6,469,770 B2 * | 10/2002 | Hoshino et al. | ............. | 355/40 |
| 6,750,888 B1 * | 6/2004 | Nakagawa | .................. | 715/800 |
| 2002/0135621 A1 * | 9/2002 | Angiulo et al. | ............. | 345/838 |
| 2005/0197998 A1 * | 9/2005 | Asbury | ............................ | 707/1 |
| 2006/0119619 A1 * | 6/2006 | Fagans et al. | ................ | 345/619 |
| 2006/0161847 A1 * | 7/2006 | Holecek et al. | ................ | 715/716 |
| 2006/0287974 A1 * | 12/2006 | Mochizuki et al. | ................ | 707/1 |
| 2007/0203948 A1 * | 8/2007 | Yoshida et al. | ............. | 707/104.1 |
| 2007/0268317 A1 * | 11/2007 | Banay | .......................... | 345/660 |
| 2008/0098316 A1 * | 4/2008 | Declan | .......................... | 715/764 |
| 2008/0104535 A1 * | 5/2008 | DeLine et al. | ................ | 715/785 |
| 2009/0058822 A1 * | 3/2009 | Chaudhri | ..................... | 345/173 |

FOREIGN PATENT DOCUMENTS

| | | |
|---|---|---|
| JP | A-05-257788 | 10/1993 |
| JP | A-10-124489 | 5/1998 |
| JP | A-2000-298679 | 10/2000 |

* cited by examiner

*Primary Examiner* — Joni Hsu
*Assistant Examiner* — David H Chu
(74) *Attorney, Agent, or Firm* — Oliff & Berridge, PLC (57) ABSTRACT

A document information managing apparatus includes: a storage storing document information and a first reference image in correspondence with each other, the first reference image being formed by changing a size of an output image of the document information based upon first magnification; a producing unit producing a second reference image having a size changed based upon second magnification smaller than the first magnification in relation to the document information when the size of the output image is larger than a predetermined size; a display displaying the first reference image when the size of the output image is smaller than the predetermined size, and displaying the second reference image when the size of the output image is larger than the predetermined size; and a display determining unit, when the second reference image is selected, controlling the display to display the first reference image relating to the selected second reference image.

10 Claims, 10 Drawing Sheets

| PAPER SIZE | THUMBNAIL | REDUCED THUMBNAIL |
|---|---|---|
| B5 | □ | — |
| A4 | □ | — |
| B4 | □ | — |
| A3 | □ | — |
| B3 | □ | — |
| A2 | ▯ | ▯ —111b |
| B2 | ▯ | ▯ —111b |
| A1 | ▯ | ▯ —111b |
| B1 | ▯ | ▯ —111b |

110c — PAPER SIZE
110a — THUMBNAIL
110b — REDUCED THUMBNAIL

DOCUMENT INFORMATION MANAGING APPARATUS AND COMPUTER READABLE MEDIUM

CROSS-REFERENCE TO RELATED APPLICATIONS

This application is based on and claims priority under 35 U.S.C. 119 from Japanese Patent Application No. 2007-327079 filed Dec. 19, 2007.

BACKGROUND

1. Technical Field

The present invention is related to a document information managing apparatus and a computer readable medium.

2. Related Art

Document information managing apparatuses are known in the technical filed, which can improve efficiencies of managing document information by displaying thumbnails as reference images of the document information on display windows.

SUMMARY

According to an aspect of the present invention, a document information managing apparatus includes: a storage that stores document information and a first reference image in correspondence with each other, the first reference image being formed by changing a size of an output image of the document information based upon first magnification; a producing unit that produces a second reference image having a size changed based upon second magnification smaller than the first magnification in relation to the document information in a case where the size of the output image of the document information is larger than a predetermined size; a display that displays the first reference image in a case where the size of the output image of the document information is smaller than the predetermined size, and that displays the second reference image in a case where the size of the output image of the document information is larger than the predetermined size; and a display determining unit that, in a case where the second reference image is selected, controls the display to display the first reference image relating to the selected second reference image.

BRIEF DESCRIPTION OF THE DRAWINGS

Exemplary embodiment of the present invention will be described in detail based on the following figures, wherein.

DETAILED DESCRIPTION

Referring now to drawings, various embodiment modes as to a document information managing apparatus and a document information managing program of the present invention will be described in detail.

First Embodiment Mode

Arrangement of Document Information Managing Apparatus

Figure 1:
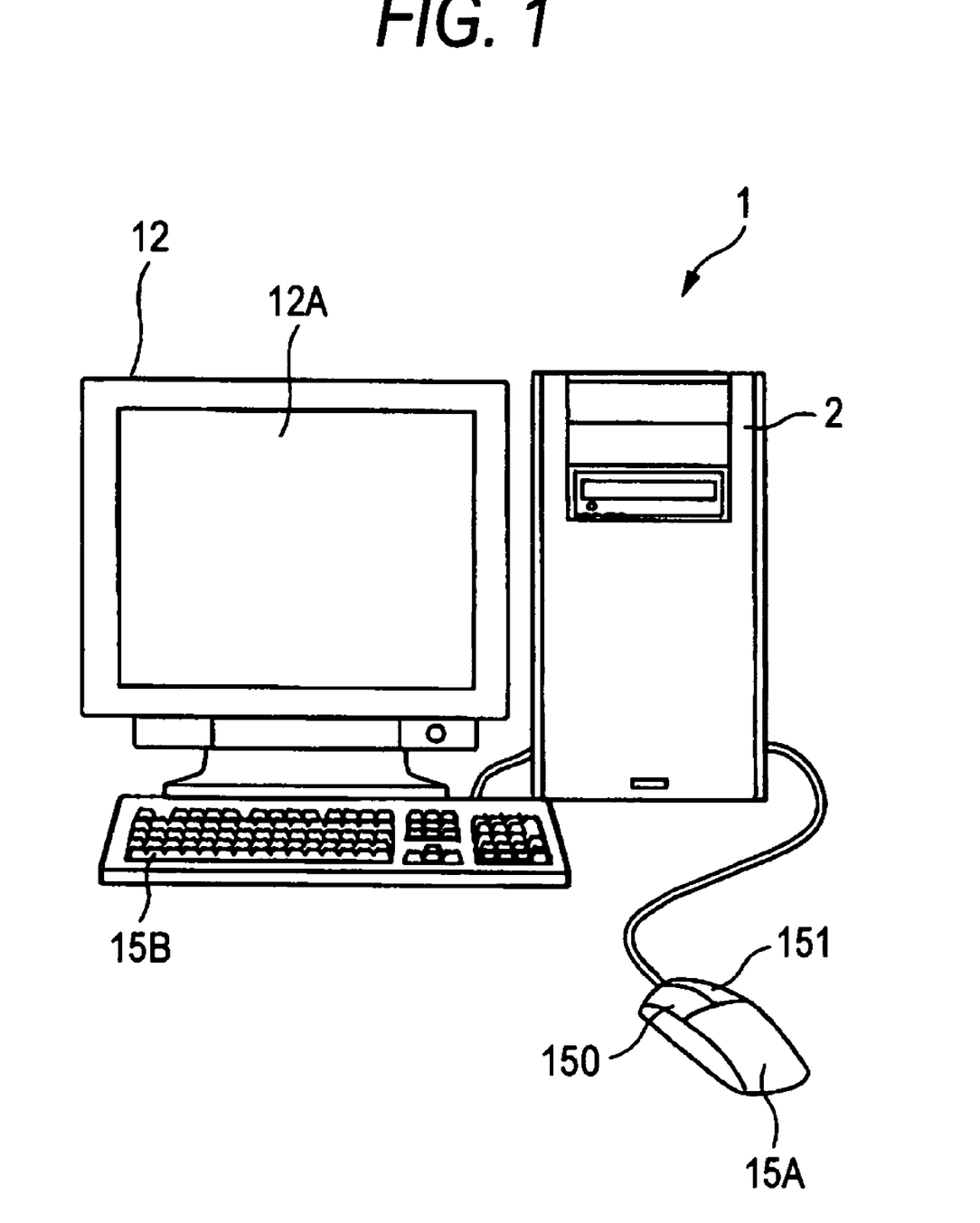
FIG. 1 is a schematic diagram for indicating one structural example of document information managing apparatus according to a first embodiment mode of the present invention.

FIG. 1 is a diagram for schematically representing one structural example as to a document information managing apparatus according to a first embodiment mode of the present invention.

A personal computer (PC) 1 functioning as the document information managing apparatus is arranged by a main body 2, a display 12, a mouse 15A, and a keyboard 15B. The main body 2 contains thereinto electronic components such as a CPU (Central Processing Unit), an HDD (Hard Disk Drive), and the like. While the display 12 has a display screen 12A constructed of a liquid crystal display, or the like, the display 12 displays thereon characters, images, and the like. The mouse 15A positionally controls a cursor, or the like displayed on the display screen 12A, while a position recognizing unit (not shown) is contained in a bottom plane of this mouse 15A. Furthermore, the moues 15A selects display contents and performs determining operations by employing a left switch 150 and a right switch 151. The keyboard 15B contains a plurality of key switches so as to enter characters and symbols.

The above-described PC 1 can display document information stored in the HDD (which has been contained as storage in main body 2) on the display screen 12A by employing characters, and images, so that the PC 1 can refer to and manage the displayed document information, and also, can edit document information under observation by employing the mouse 15A and the keyboard 15. In this example, the above-described document information corresponds to a document file which has been produced by operating a word-processor, and/or executing spreadsheet software, or the like, and also, corresponds to an image data file of a photograph, an illustration, and the like.

Figure 2:
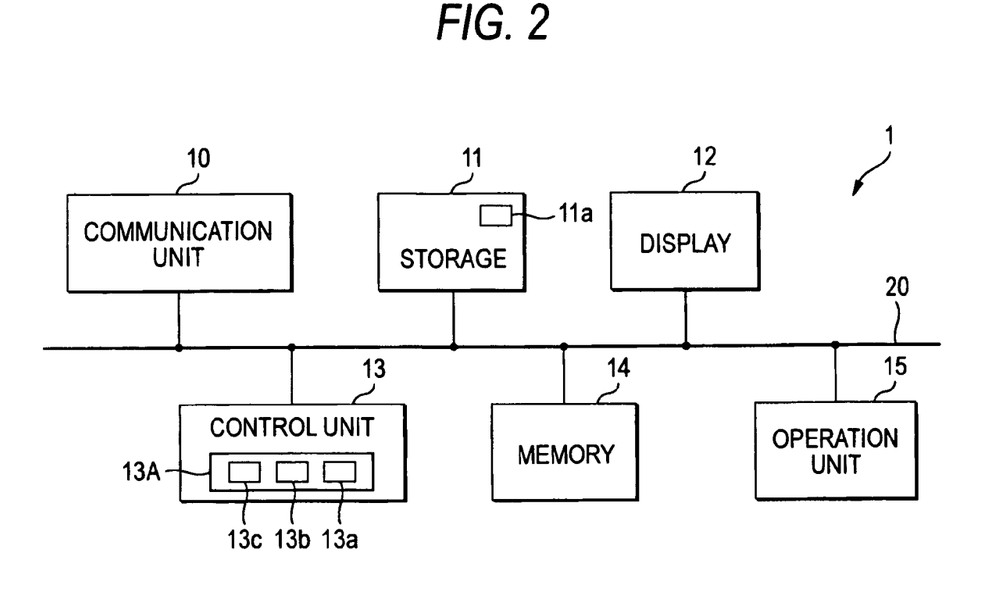
FIG. 2 is a block diagram for indicating structural example as to the document information managing apparatus according to the first embodiment mode of the present invention.

FIG. 2 is a block diagram for indicating a structural example of the document information managing apparatus according to the first embodiment mode of the present invention.

The PC 1 contains a communication unit 10, a storage 11, display 12, a control unit 13, a memory 14, and an operation unit 15. The communication unit 10 transmits and/or receives information to and/or from an external unit (not shown) by employing the Ethernet (registered trademark), a wireless LAN, or the like. The storage 11 is constituted by, for example, a rewritable storage apparatus such as an HDD, and stores thereinto a plurality of document information 11a. The display 12 has both the display screen 12A constructed of the liquid crystal display, or the like, and a driving unit for driving the display screen 12A. The memory 14 temporarily stores thereinto information, and mainly assists process operations of the control unit 13. The operation unit 15 transmits operating signals in response to operations of the mouse 15A and the keyboard 15B to the control unit 13 so as to control operations of a program. Also, the above-described respective units have been connected to each other via a bus 20.

A document information managing program 13A which is executed on the control unit 13 contains a reduced thumbnail producing unit 13a, a reduced thumbnail display 13b, and a reduced thumbnail display determining unit 13c. The reduced thumbnail producing unit 13a is a program for producing a reduced thumbnail (will be discussed later). The reduced thumbnail display 13b corresponds to such a program which displays a reduced thumbnail instead of a thumbnail (will be discussed later) contained in the document information 11a in such a case that a paper size of an output image of the document information 11a is larger than a predetermined size. Also, the reduced thumbnail display determining unit 13c corresponds to such a program for displaying a thumbnail in the case that a reduced thumbnail is displayed on the display screen 12A. It should also be noted that in this first embodiment mode, the above-described output image implies such an image information which is employed when document information is printed on a paper space by operating a printer, or the like so as to output the document information, while the output image contains setting information for setting such a paper size and a margin (blank) of a paper space. Also, since image information produced by reading a paper space by employing a scanner, or the like also contains setting information for setting a paper size and a margin (blank) of a paper space, this produced image information may also be handled as the output image.

Figure 3:
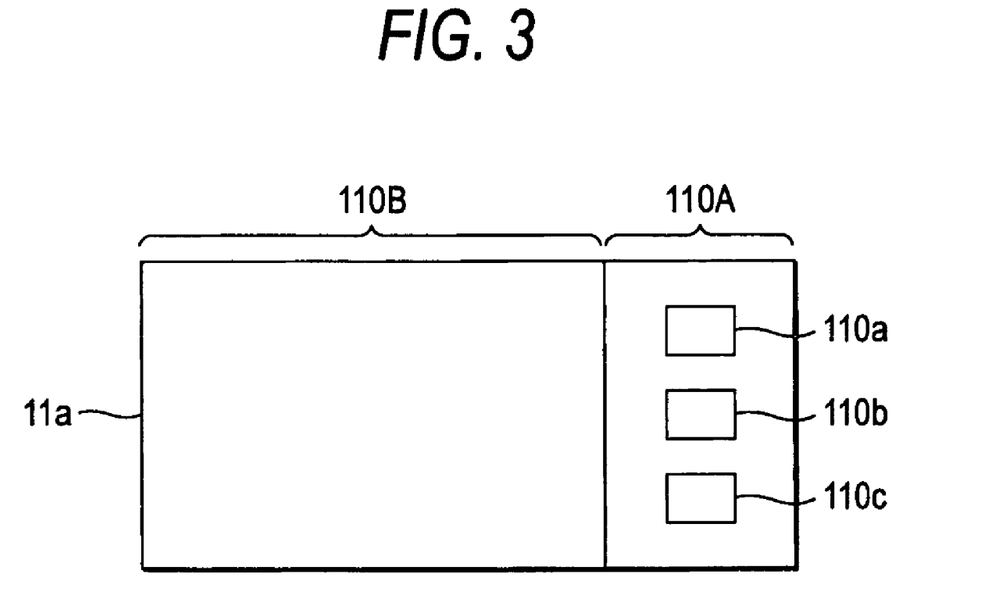
FIG. 3 is a schematic diagram for representing a structural example of document information according to the first embodiment mode of the present invention.

FIG. 3 is a schematic diagram for showing a structural example of document information according to the first embodiment mode of the present invention.

The document information 11a contains a metadata area 110A, and an actual data area 110B. The metadata area 110A is to store thereinto supplementary information containing a date when information was formed, an amount of the information, and the like. The actual data area 110B is to store thereinto a content of an image data file such as a photograph and an illustration as information; and to store thereinto a document file formed by a wordprocessor, spreadsheet software, and the like, as information.

The metadata area 110A contains a thumbnail 110a and a reduced thumbnail 110b, which are produced by reducing a size of an output image produced based upon the actual data area 110B; and also, contains a paper size 110c for setting a size of a paper space when the output image is printed and is scanned. The thumbnail 110a corresponds to such an image which is formed based upon all of the document information 11a by executing a document information managing program 13A in such a manner that a size of this formed thumbnail 110a becomes such a size defined by multiplying the size of the output image by predetermined magnification (first magnification). The reduced thumbnail 110b corresponds to such an image which is formed based upon the document information 11a where the paper size 110c of the output image exceeds a predetermined size (for example, the document information 11a whose paper size 110c is larger than A2 size) in such a manner that a size of this formed reduced thumbnail 110b becomes such a size defined by multiplying a display size of the output image by predetermined magnification (second magnification). It is so assumed that the second magnification is smaller than the first magnification.

Figure 4:
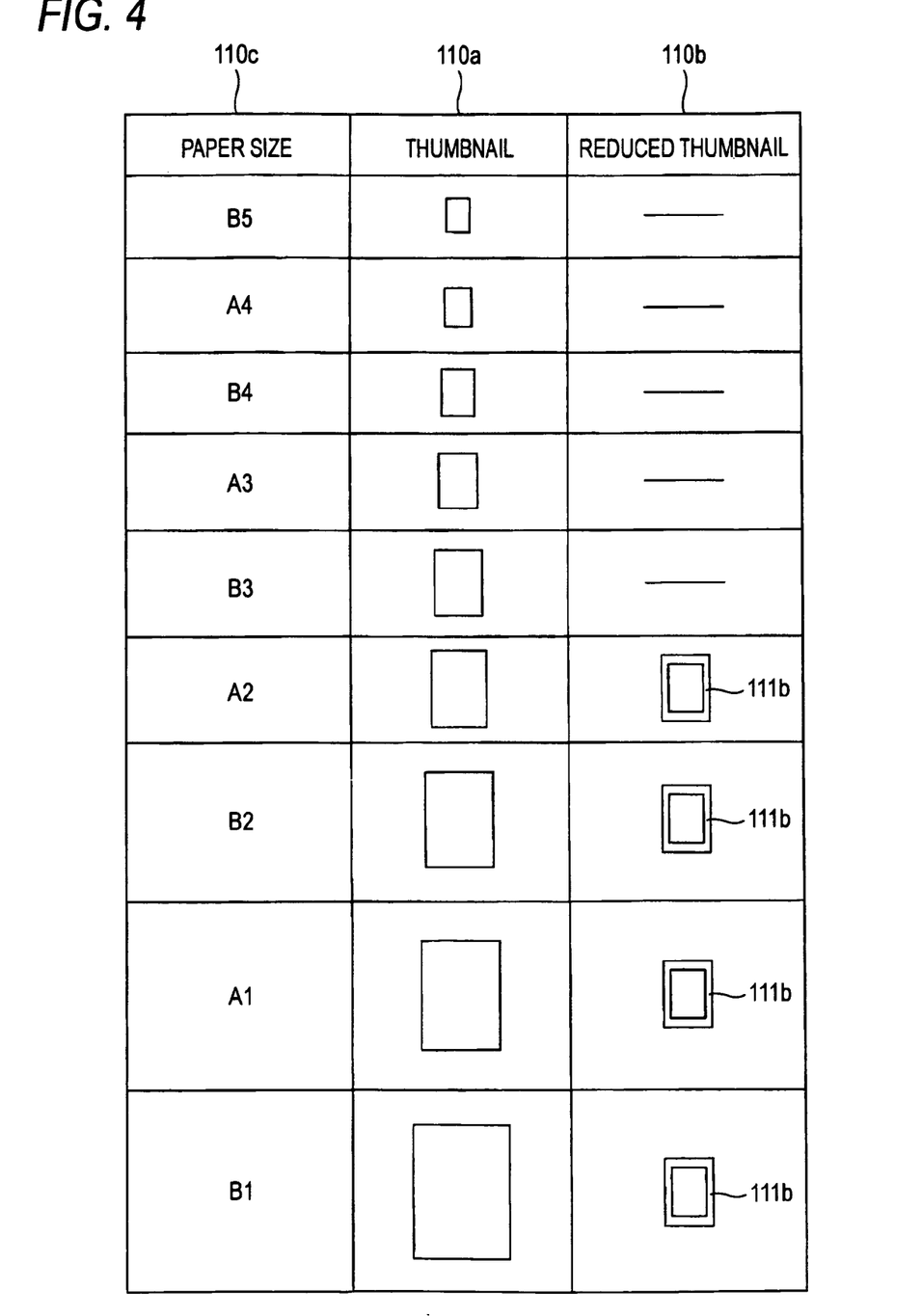
FIG. 4 is a schematic diagram for showing a concrete example as to thumbnails and reduced thumbnails, according to the first embodiment mode of the present invention.

FIG. 4 is a schematic diagram for showing an concrete example as to the thumbnails 110a and the reduced thumbnails 110b related to the first embodiment mode of the present invention.

The thumbnails 110a have been produced by changing sizes thereof in such a manner that display sizes of output images of the document information 11a are multiplied by the predetermined magnification, and the display sizes are directly proportional to the paper sizes 110c. It is so assumed that the reduced thumbnails 110b are produced with respect to the document information 11a having output images in which, for example, the paper sizes 110c have been set to be larger than, or equal to a so-called "A2" size, while the display sizes thereof are equal to each other irrespective of the paper sizes 110c. Also, in order that the thumbnails 110a can be discriminated from the reduced thumbnails 110b in view of representations, display modes of the thumbnails 110a and the reduced thumbnails 110b may be alternatively changed in such a manner that, for instance, edges 111b are made on the reduced thumbnails 110b.

It should also be noted that the magnification when the thumbnails 110a are produced may be changed in response to the dimension of the display screen of the PC 1, or may be alternatively changed based upon sizes of display areas on which the thumbnails 110a are displayed. In this alternative case, it is so assumed that the magnification to be changed is changed by the same degree as to the magnification when the reduced thumbnails 110b are produced in a conjunction manner. Alternatively, the display sizes of the reduced thumbnails 110b may be directly proportional to the paper sizes 110c.

Figure 5A:
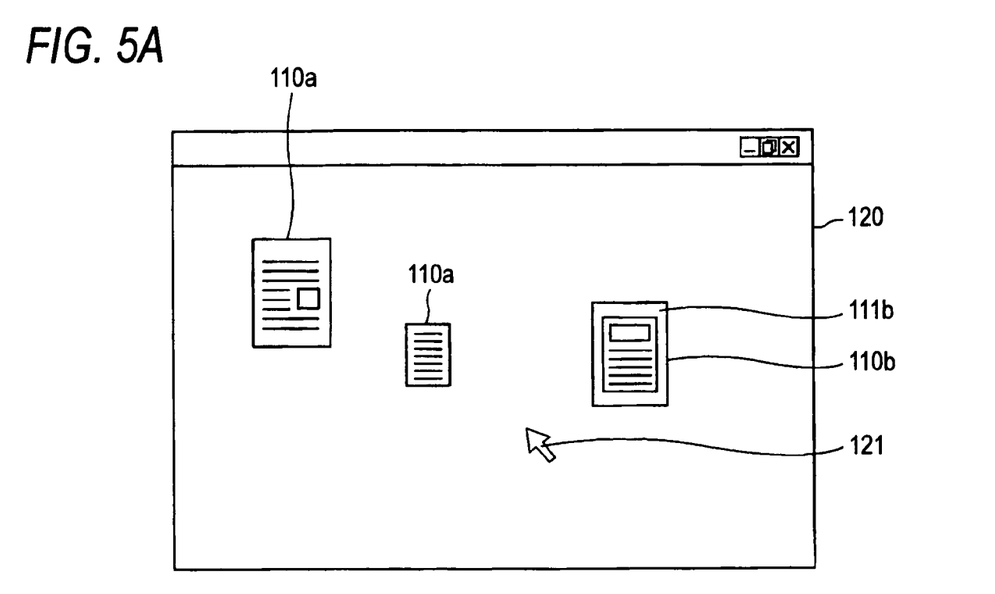
FIGS. 5A and 5B are schematic diagrams for indicating display examples as to thumbnails and reduced thumbnails, according to the first embodiment mode of the present invention.
Figure 5B:
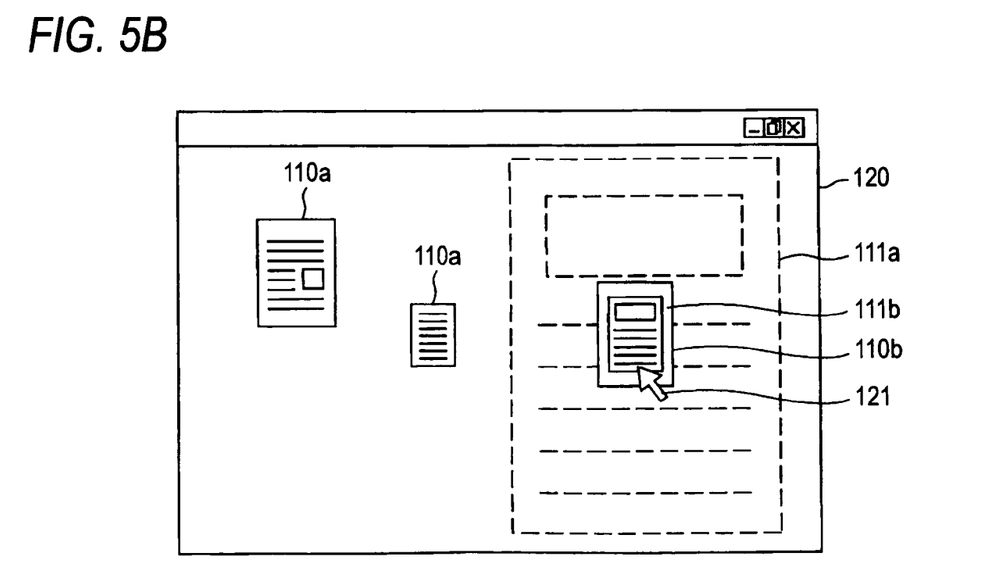

FIGS. 5A and 5B are schematic diagrams for showing display examples as to thumbnails and reduced thumbnails, which are related to the first embodiment mode of the present invention.

As represented in FIG. 5A, while a display window 120 displays the document information 11a as the thumbnail 110a and the reduced thumbnail 110b, the thumbnail 110a and the reduced thumbnail 110b can be selected by a pointer 121. This display window 120 corresponds to a display area for referring to the document information 11a to be displayed on the display screen 12A, while a display process operation has been executed by a document information managing program 13A. The pointer 121 can be moved by the operation unit 15, and is moved by employing, for example, the mouse 15A. The thumbnail 110a and the reduced thumbnail 110b are selected in such a manner that the pointer 121 is overlapped on any one of the thumbnail 110a and the reduced thumbnail 110b and then the left switch 150 of the mouse 15A is operation.

It should also be understood that the thumbnail 110a and the reduced thumbnail 110b may be alternatively displayed by arranging therewith the information of the metadata area 110A of the document information 11a, for example, filenames, file formed time instants, and the like may be arranged with the thumbnail 110a and the reduced thumbnail 110b.

The reduced thumbnail 110b is selected by operating the left switch 150 of the mouse 15A by overlapping the pointer 121 on the reduced thumbnail 110b, and as represented in FIG. 5B, since the reduced thumbnail 110b is selected, the thumbnail 110a is displayed on a rear plane of the reduced thumbnail 110b in a semi-transparent manner as a comparison-purpose thumbnail 111a. It should also be understood that the comparison-purpose thumbnail 111a may be alternatively displayed on a front plane of the reduced thumbnail 110b, or may be displayed without being made in the semi-transparent manner, otherwise, only an outer shape of this comparison-purpose thumbnail 111a may be displayed.

(Operations)

Referring now to the respective drawings, a description is made of operations of the document information managing apparatus according to embodiment modes of the present invention.

When the operation unit 15 is operated by the user so as to request to initiate the document information managing program 13A, the document information managing program 13A displays the display window 120, and acquires the document information 11a within a folder designated by the user.

Figure 6:
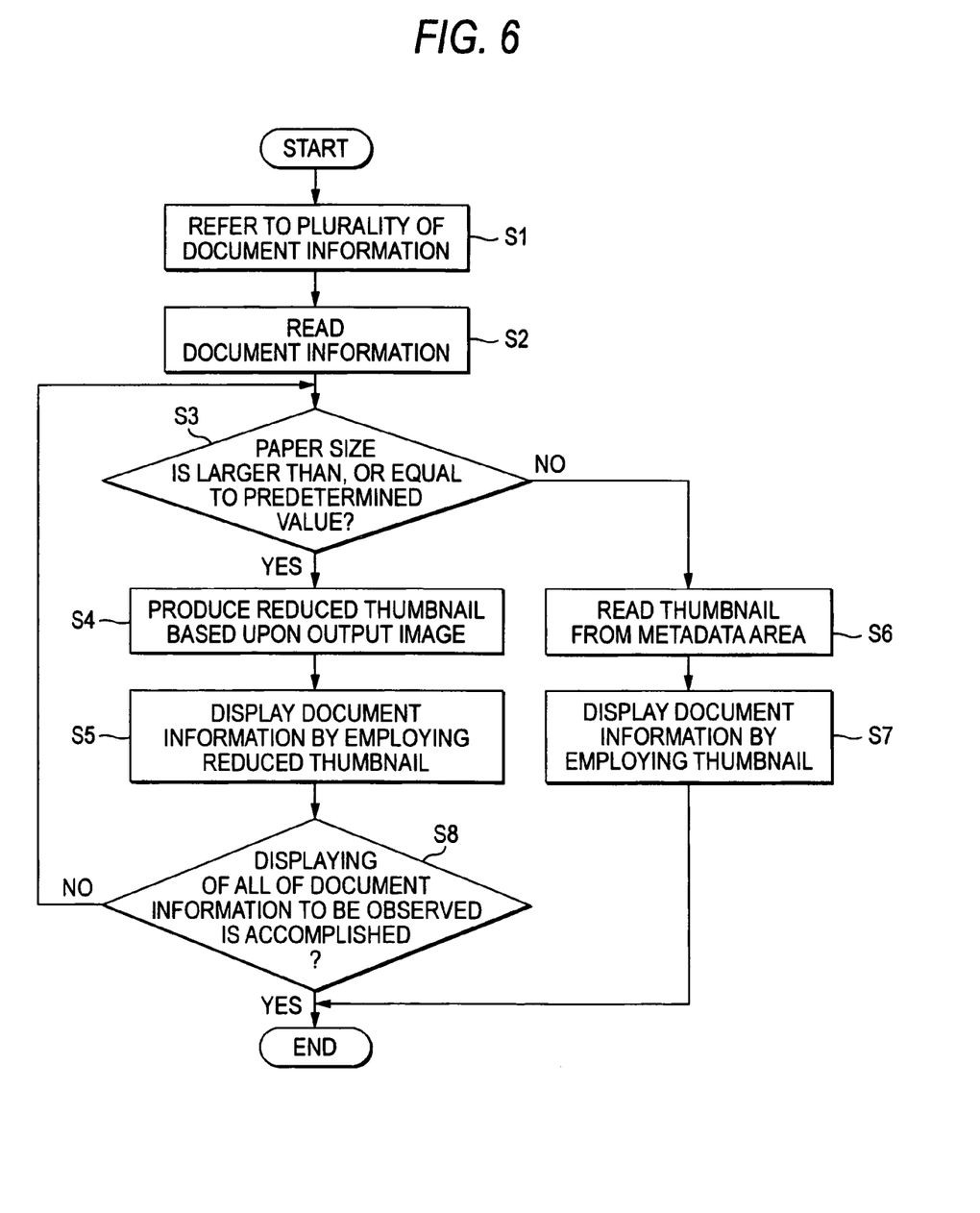
FIG. 6 is a flow chart for describing an operation example of a document information managing program according to the first embodiment mode of the present invention.

FIG. 6 is a flow chart for describing an operation example as to the document information managing program 13A according to the first embodiment mode of the present invention.

Firstly, the document information managing program 13A refers to the document information 11a which is to be stored in the storage 11 (step S1). Next, in such a case that the document information managing program 13A reads one piece of document information 11a within the document information 11a (step S2), and the paper size 110c of the output image of this document information 11a is larger than, or equal to a predetermined value, for example, the "A2" size ("Yes" in step S3), the reduced thumbnail producing unit 13a of the document information managing program 13A reduces a size of an output image of the document information 11a based upon the predetermined magnification so as to produce the reduced thumbnail 110b (step S4). Next, the reduced thumbnail display 13b displays the reduced thumbnail 110b in combination with the display window 120 (step S5).

Also, in the case that the paper size 110c of the output image of the document information 11a is smaller than the predetermined value, for instance, the "A2" size ("No" in step S3), the document information managing program 13A reads the thumbnail 110a from the metadata area 110A of the document information 11a (step S6). Next, the reduced thumbnail display 13b displays the thumbnail 110a in combination with the display window 120. While the document information managing program 13A executes the process operations defined from the step S2 to the step S7 with respect to all of the document information 11a to which the document information managing program 13A refers ("No" in step S8), if the process operations are accomplished with respect to all of the document information 11a ("Yes" in step S8), the operation of this document information managing program 13A is ended.

Alternatively, the reduced thumbnail 110b may be previously produced in such a manner that when the document information managing program 13A refers to the document information 11a, this reduced thumbnail 110b may be acquired. Since the reduced thumbnail 110b is previously produced, the work load given to the display process operation by the document information managing program 13A may be reduced, so that the display speed thereof may be improved.

Figure 7:
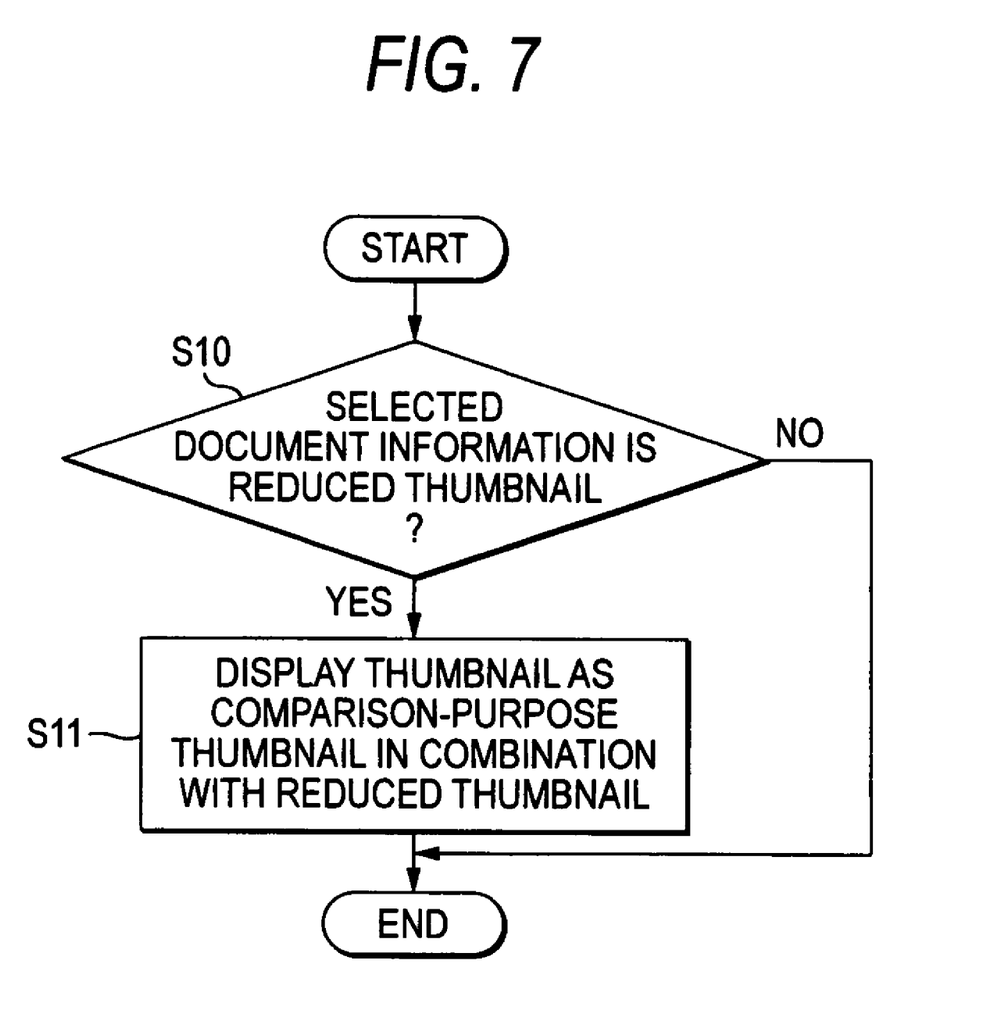
FIG. 7 is a flow chart for describing an operation example of a document managing program according to the first embodiment mode of the present invention.

FIG. 7 is a flow chart for describing an operation example as to a document managing program 13a according to the first embodiment mode of the present invention.

When the reduced thumbnail 110b is brought into a selection condition by the pointer 121 on the display window 120, the reduced thumbnail display determining unit 13c of the document managing program 13a judges whether or not the selected document information 11a has been displayed by employing the reduced thumbnail 110b (step S10). In such a case that the reduced thumbnail display determining unit 13c judges that the selected document information 11a has been displayed by employing the reduced thumbnail 110b ("Yes" in step S10), the document managing program 13a displays a comparison-purpose thumbnail 111a formed by making the thumbnail 110a in the semi-transparent manner on the rear plane of the reduced thumbnail 110b in combination with the reduced thumbnail 110b (step S11). On the other hand, in such a case that the reduced thumbnail display determining unit 13c judges that the selected document information 11a has not been displayed by employing the reduced thumbnail 110b ("No" in step S10), the document managing program 13a executes only the selecting operation as the document managing program 13a, but does not execute any operation related to the display operation.

Second Embodiment Mode

Figure 8A:
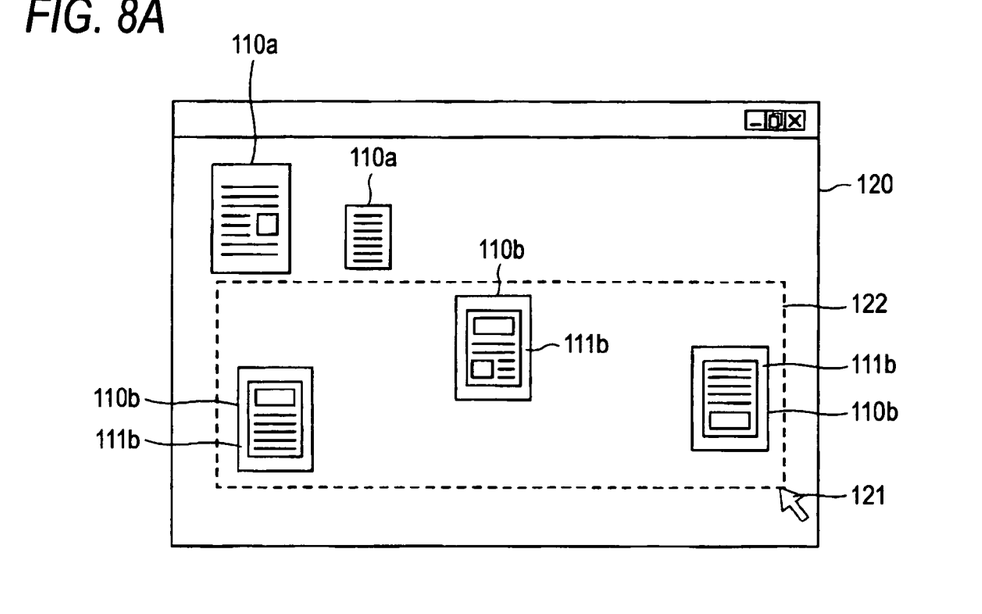
FIGS. 8A and 8B are schematic diagrams for indicating display examples as to thumbnails and reduced thumbnails, according to a second embodiment mode of the present invention.
Figure 8B:
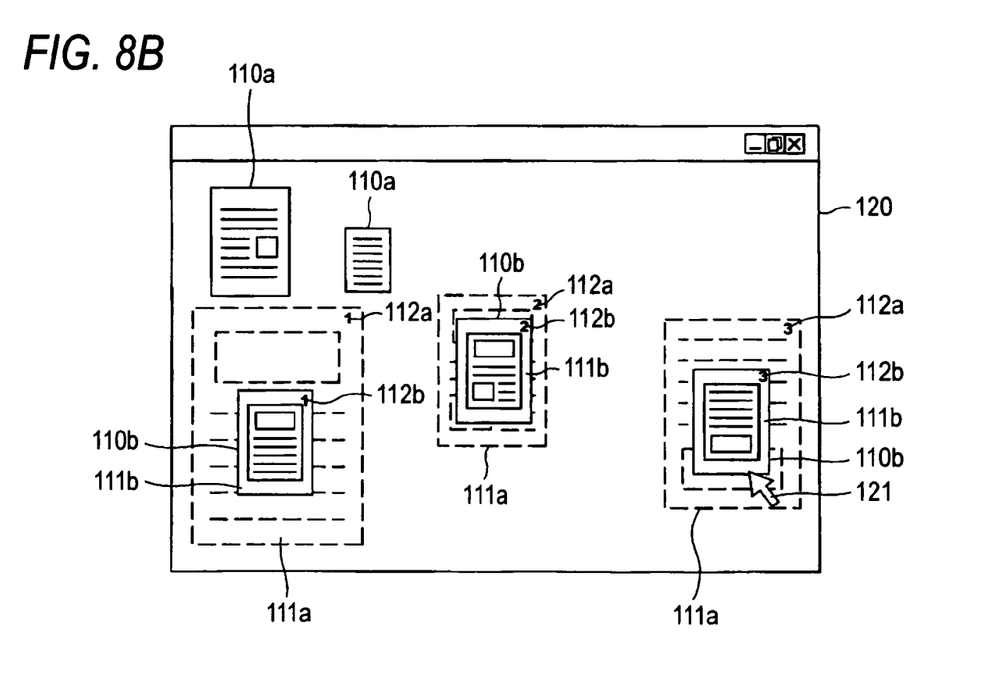

FIGS. 8A and 8B are schematic diagrams for indicating display examples as to thumbnails 110a and reduced thumbnails 110b, according to a second embodiment mode of the present invention. It should be noted that the commonly-used reference numerals shown in the first embodiment mode will be applied to the same structures thereof and the same functions thereof in the second embodiment mode in the below-mentioned descriptions.

As shown in FIG. 8A, the display window 120 displays the document information 11a as the thumbnail 110a and the reduced thumbnail 110b. Since the mouse 15A is moved while the left switch 150 of the mouse 15A is depressed, a selection frame 122 can be formed, and thus, the pointer 121 can select the thumbnail 111a and the reduced thumbnail 110b, which are positioned inside the selection frame 122.

As represented in FIG. 5B, since the reduced thumbnail 110b is selected, the thumbnail 110a is displayed on the rear plane of the reduced thumbnail 110b as the comparison-purpose thumbnail 111a in the semi-transparent manner. The comparison-purpose thumbnail 111a has a thumbnail number 112a, whereas the reduced thumbnail 110b has a reduced thumbnail number 112b. Both the thumbnail number 112a and the reduced thumbnail number 112b, which belong to the same document information 11a, represent the same numbers, so that these numbers may be defined in correspondence with each other. It should also be noted that the thumbnail number 112a and the reduced thumbnail number 112b may be alternatively displayed by employing not only numerals, but also characters, symbols, icons, or the like. Also, the thumbnail number 112a and the reduced thumbnail number 112b are applied by the reduced thumbnail display determining unit 13c.

Third Embodiment Mode

Figure 9A:
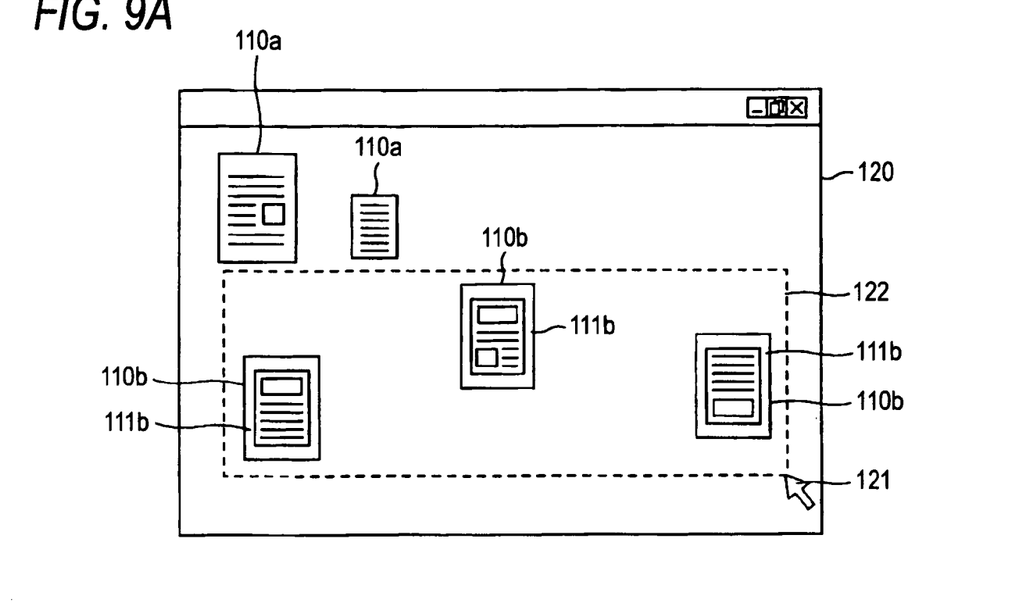
FIGS. 9A and 9E are schematic diagrams for indicating display examples as to thumbnails and reduced thumbnails, according to a third embodiment mode of the present invention.
Figure 9B:
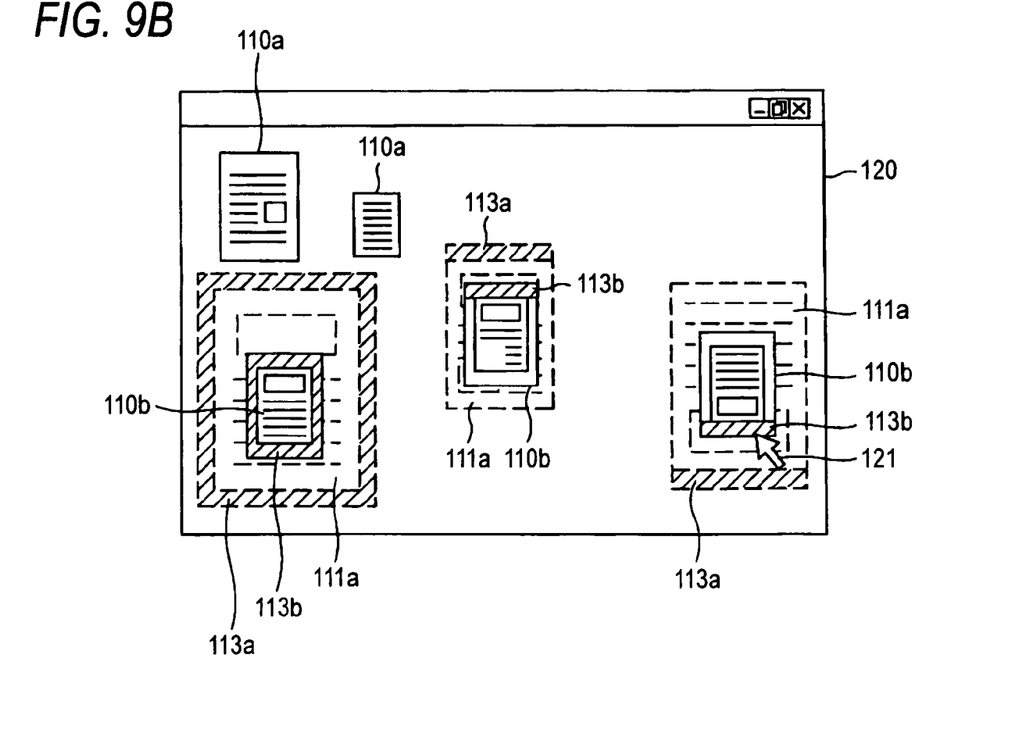

FIGS. 9A and 9B are schematic diagrams for indicating display examples as to thumbnails 110a and reduced thumbnails 110b, according to a third embodiment mode of the present invention.

As represented in FIG. 93, since the reduced thumbnail 110b is selected, the thumbnail 110a is displayed on the rear plane of the reduced thumbnail 110b as the comparison-purpose thumbnail 111a in the semi-transparent manner. The comparison-purpose thumbnail 111a has a thumbnail edge 113a, whereas the reduced thumbnail 110b has a reduced thumbnail edge 113b. Both the thumbnail edge 113a and the reduced thumbnail edge 113b, which belong to the same document information 11a, represent the same edge patterns, so that these edge patterns may be defined in correspondence with each other. It should also be noted that the thumbnail edge 113a and the reduced thumbnail edge 113b may be alternatively displayed by employing not only the edge patterns, but also by changing luminance and hue, or transparency, or the like as to the edges. Also, the thumbnail edge 113a and the reduced thumbnail edge 113b are applied by the reduced thumbnail display determining unit 13c.

Fourth Embodiment Mode

Figure 10A:
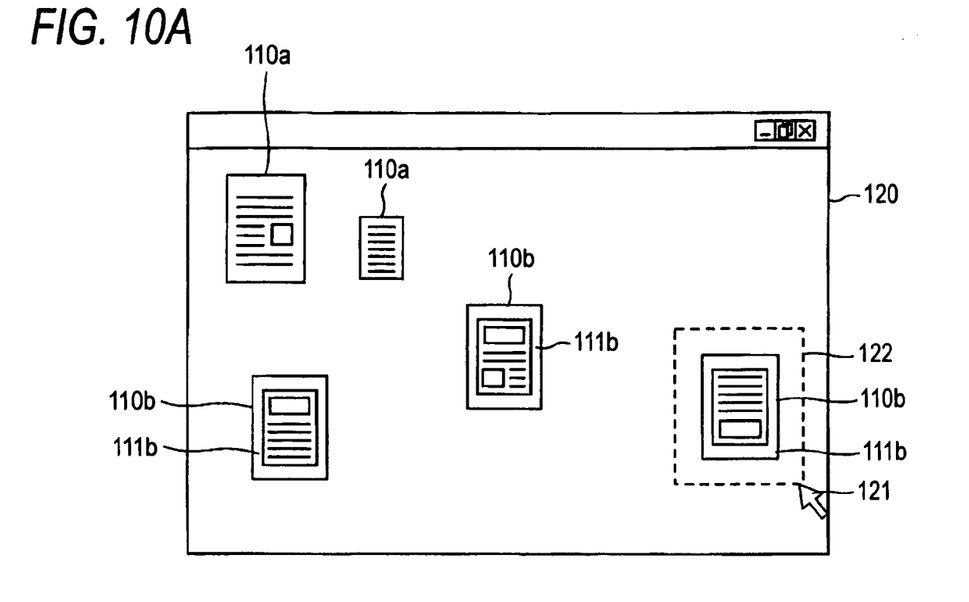
FIGS. 10A and 10B are schematic diagrams for indicating display examples as to thumbnails and reduced thumbnails, according to a fourth embodiment mode of the present invention.
Figure 10B:
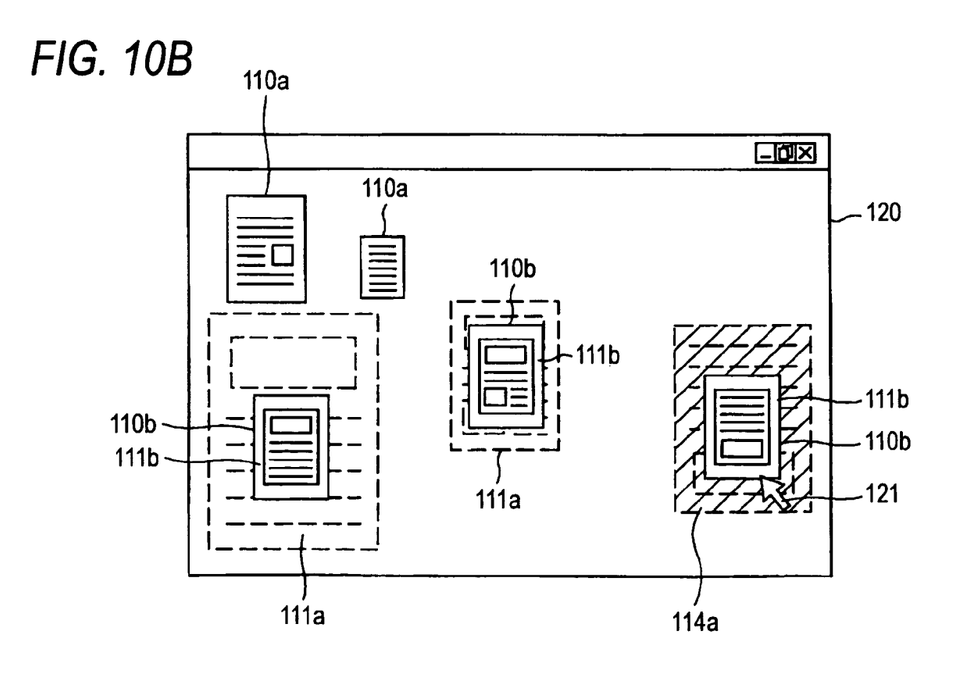

FIGS. 10A and 10B are schematic diagrams for indicating display examples as to thumbnails 110a and reduced thumbnails 110b, according to a fourth embodiment mode of the present invention.

As represented in FIG. 10B, since the reduced thumbnail 110b is selected, the thumbnail 110a is displayed on the rear plane of the reduced thumbnail 110b as the comparison-purpose thumbnail 111a in the semi-transparent manner, and furthermore, as to such a reduced thumbnail 110b which has not been selected, the thumbnail 110a is displayed on the rear planes thereof in the semi-transparent manner. Also, as to the reduced thumbnail 110b which has been selected, a highlight display thumbnail 114a is displayed as the comparison-purpose thumbnail 111a, and is displayed in different luminance and different hue from those of other comparison-purpose thumbnail 111a. It should also be noted that the highlight display thumbnail 114a may be displayed not only in the different luminance and the different hue, but also by employing a specific icon, a specific display character, a specific numeral, and a specific symbol. Also, the highlight display thumbnail 114a is applied by the reduced thumbnail display determining unit 13c.

Fifth Embodiment Mode

In the above-described fourth embodiment mode, when the document information 11a is selected while this document information 11a is being displayed by employing the reduced thumbnail 110b, both the thumbnail 110a corresponding to the selected reduced thumbnail 110b and the thumbnail 110a corresponding to the reduced thumbnail 110b which has not been selected have been displayed. Alternatively, even when the document information 11a being displayed by employing the thumbnail 110a is selected (because paper size 110c of output image of document information 11a cannot satisfy predetermined value), such a thumbnail 110a corresponding to the not-selected reduced thumbnail 110b may be displayed as a comparison-purpose thumbnail 111a.

For instance, in the case that a document information managing apparatus is equipped with such an interface that a certain (reduced) thumbnail is selected and is moved (dragged) and then is positioned (dropped) on another (reduced) thumbnail so as to couple two pieces of document information with each other, which correspond to both (reduced) thumbnails (namely, two pieces of document information are "bundled" with each other), it is important that paper sizes of output images as to two pieces of the document information are recognized with respect to the user. In accordance with a fifth embodiment mode of the present invention, when a selection of the document information is performed which constitutes an origin of the above-described "bundling" work, the user may institutively recognize the paper sizes of the output image of the respective document information.

Sixth Embodiment Mode

In the first embodiment mode to the fifth embodiment mode, when either the reduced thumbnail 110b or the thumbnail 110a is selected, it has been arranged that the comparison-purpose thumbnail 111a is continuously displayed. Alternatively, in such a case that a predetermined condition can be satisfied, the comparison-purpose thumbnail 111a may be displayed in a sixth embodiment mode of the present invention.

For example, in such a case that a difference between the paper size 110c of the output image of the selected document information 11a and the paper size 110c of the output image of another document information 11a stored in the same storage area which can be visually recognized by the user when this document information 11a is selected (otherwise, another document information 11a is present in same storage area [same folder, or same directory] for storing selected document information 11a) is larger than, or equal to a predetermined value, the comparison-purpose thumbnail 111a may be displayed. To the contrary, when the difference is not larger than, or equal to the predetermined value, the comparison-purpose thumbnail 111a may not be displayed (as to document information 11a being displayed by employing reduced thumbnail 110b, only reduced thumbnail 110b is displayed).

Other Embodiment Modes

It should also be understood that the present invention is not limited only to the above-described embodiment modes, but may be modified without departing from the gist of the present invention. For instance, while the document information managing program 13A may be arranged in such a manner that this document information managing program 13A is operable by an external server, or the like, operation controls thereof may be carried out in the PC 1.

Alternatively, the document information managing program 13A used in the above-described embodiment mode may be read out from the storage medium such as a CD-ROM so as to be loaded in the storage provided in the apparatus. Otherwise, the document information managing program 13A may be alternatively downloaded from a server, or the like, which have been connected to such a network as the Internet, into the storage employed in the apparatus. Also, either a portion or an entire portion of the document information managing program 13A used in the above-described embodiment mode may be alternatively realized by such a hardware as an ASIC.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document information managing apparatus comprising:
a storage that stores a first reference image generated from an original document, and paper size information of the original document, the first reference image having a size proportional to a paper size of the original document;
a producing unit that produces a second reference image in relation to the original document when the paper size of the original document is larger than a predetermined size;
a display determining unit that displays the first reference image where the paper size is smaller than the predetermined size on a display, and that displays the second reference image where the paper size is larger than the predetermined size on the display, wherein,
in response to a selection of the second reference image, the display determining unit displays the first reference image that corresponds to the selected second reference image at a position where the second reference image is displayed,
the storage further includes a first magnification, a second magnification, and a relationship between a name of the paper size and an output size of the paper size,
the first reference image is generated based on the first magnification,
the producing unit produces the second reference image based on the second magnification, and
the second magnification is smaller than the first magnification.

2. The document information managing apparatus as claimed in claim 1,
wherein,
in the case that the second reference image is selected, the display determining unit controls the display to display the first reference image related to the second reference image.

3. The document information managing apparatus as claimed in claim 2,
wherein
the display determining unit controls the display to display the first reference image that is correlated to the selected second reference image in a different display mode.

4. A document information managing apparatus comprising:
a storage that stores document information and a first reference image in correspondence with each other, the first reference image being formed by changing a size of an output image of the document information based upon first magnification;
a producing unit that produces a second reference image having a size changed based upon second magnification smaller than the first magnification in relation to the document information in a case where the size of the output image of the document information is larger than a predetermined size;
a display that displays the first reference image in a case where the size of the output image of the document information is smaller than the predetermined size, and that displays the second reference image in the case that the size of the output image of the document information is larger than the predetermined size; and
a display determining unit that, in a case where any one of the first reference image and the second reference image is selected, controls the display to display the first reference image correlated to the second reference image, wherein
displaying the first reference image correlated to the second reference image includes displaying the first reference image and the second reference image in a super imposed manner.

5. The document information managing apparatus as claimed in claim 4,
wherein,
in the case that the display determining unit satisfies a predetermined condition, the display determining unit controls the display to display the first reference image correlated to the second reference image.

6. The document information managing apparatus as claimed in claim 5,
wherein
the predetermined condition implies that a difference between a size of an output image of first document information corresponding to any one of the selected first reference image and the selected second reference image, and a size of an output image of a second document information other than the first document information is larger than a predetermined value.

7. The document information managing apparatus as claimed in claim 6,
wherein
the second document information is document information corresponding to any one of the selected first reference image and the selected second reference image, or is document information which is present in the same storage area storing the document information corresponding to the selected first reference image.

8. A non-transitory computer readable medium storing a program causing a computer to execute a process for managing document information, the process comprising:
storing the document information and a first reference image in correspondence with each other, the first reference image being formed by changing a size of an output image of the document information based upon first magnification;
producing a second reference image having a size changed based upon second magnification smaller than the first magnification in relation to the document information in a case where the size of the output image of the document information is larger than a predetermined size;
displaying the first reference image in a case where the size of the output image of the document information is smaller than the predetermined size, and that displaying the second reference image in a case where the size of the output image of the document information is larger than the predetermined size; and
controlling, in a case where the second reference image is selected, the display to display the first reference image relating to the selected second reference image, wherein
displaying the first reference image relating to the selected second reference image includes displaying the first reference image and the selected second reference image in a super imposed manner.

9. The document information managing apparatus according to claim 1, wherein the display determining unit displays the first reference image in a super imposed manner with the second reference image when the second reference image is selected.

10. The document information managing apparatus according to claim 9, wherein the display determining unit displays the first reference image in a semi-transparent manner when the second reference image is selected.

* * * * *